(12) United States Patent
Kanagaraj et al.

(10) Patent No.: US 10,331,964 B2
(45) Date of Patent: Jun. 25, 2019

(54) TRUNK INVENTORY DETECTOR

(71) Applicant: Panasonic Automotive Systems Company of America, Division of Panasonic Corporation of North America, Peachtree City, GA (US)

(72) Inventors: Padmanaban Kanagaraj, Farmington Hills, MI (US); Katherine J. Freund, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 107 days.

(21) Appl. No.: 15/599,103

(22) Filed: May 18, 2017

(65) Prior Publication Data
US 2017/0337437 A1 Nov. 23, 2017

Related U.S. Application Data

(60) Provisional application No. 62/340,339, filed on May 23, 2016.

(51) Int. Cl.
*G01G 19/08* (2006.01)
*G06K 9/00* (2006.01)
*H04N 1/00* (2006.01)

(52) U.S. Cl.
CPC ......... *G06K 9/00832* (2013.01); *G01G 19/08* (2013.01); *H04N 1/00209* (2013.01)

(58) Field of Classification Search
CPC . G01G 19/08; G06K 9/00832; H04N 1/00209
See application file for complete search history.

(56) References Cited

U.S. PATENT DOCUMENTS

| | | | | |
|---|---|---|---|---|
| 3,321,035 A * | 5/1967 | Tarpley | ............... | G01G 3/1408 177/136 |
| 5,449,864 A * | 9/1995 | Beatty | .................. | G01G 19/021 177/134 |
| 5,608,193 A * | 3/1997 | Almogaibil | ............ | G01G 19/42 177/25.13 |
| 6,384,349 B1 * | 5/2002 | Voll | ....................... | G01G 19/10 177/137 |
| 6,987,226 B2 * | 1/2006 | Sakai | .................. | G01G 19/4142 177/144 |
| 7,897,884 B2 * | 3/2011 | Harish | ............... | G01G 23/3735 177/144 |
| 9,449,488 B2 * | 9/2016 | Zafiroglu | ................ | B60R 16/02 |
| 10,054,477 B2 * | 8/2018 | Gagas | .................... | G01G 19/12 |
| 2004/0226756 A1 * | 11/2004 | Hiraki | ................ | G01G 19/4142 177/25.13 |

(Continued)

*Primary Examiner* — Randy W Gibson
(74) *Attorney, Agent, or Firm* — Laurence S. Roach, Esq.

(57) ABSTRACT

A trunk inventory detection arrangement for a motor vehicle includes a camera positioned to capture images of objects within a trunk of the motor vehicle. A weight detection device is positioned to detect a weight of the objects in the trunk. An electronic processing device is communicatively coupled to each of the camera and the weight detection device. The electronic processing device causes a user of the vehicle to be informed of the objects in the trunk based on signals received from the camera and the weight detection device.

21 Claims, 2 Drawing Sheets

(56) References Cited

U.S. PATENT DOCUMENTS

| | | | |
|---|---|---|---|
| 2006/0213695 A1* | 9/2006 | Kraft | G01G 19/4144 |
| | | | 177/25.15 |
| 2015/0137985 A1* | 5/2015 | Zafiroglu | B60R 16/02 |
| | | | 340/686.1 |
| 2016/0109281 A1* | 4/2016 | Herring | G01G 19/4144 |
| | | | 177/1 |
| 2018/0224849 A1* | 8/2018 | Gordon | G05D 1/0088 |

* cited by examiner

TRUNK INVENTORY DETECTOR

CROSS-REFERENCE TO RELATED APPLICATION

This application claims benefit of U.S. Provisional Application No. 62/340,339 filed on May 23, 2016, which the disclosure, of which is hereby incorporated by reference in its entirety for all purposes.

FIELD OF THE INVENTION

The disclosure relates to an apparatus for detecting what is in the trunk of a motor vehicle.

BACKGROUND OF THE INVENTION

A problem is that drivers and passengers of a vehicle sometimes forget about objects within the vehicle's trunk, and hence may not remove the objects from the trunk when the driver reaches his destination. This may be a problem when the driver forgets to deliver the contents of the trunk (e.g., packages) at his destination, and may particularly present a problem when the objects are perishable (e.g., milk, etc.) and need to be refrigerated fairly quickly. There is no currently known method or apparatus to remotely assess a vehicle's trunk contents.

SUMMARY

The present invention may provide a system to detect the inventory of a vehicle's trunk via sensors, cameras, and/or load cells. The system may alert the vehicle's driver of trunk contents on the instrument cluster and/or audio speakers when the driver turns off the vehicle. The system could also alert the driver via his cellphone, perhaps only after a threshold period of time has elapsed without the contents being removed from the trunk. The present invention may also provide a means for remotely viewing or remotely determining a vehicle's trunk contents for either the vehicle owner or police/border patrol.

In one embodiment, the invention comprises a trunk inventory detection arrangement for a motor vehicle, including a camera positioned to capture images of objects within a trunk of the motor vehicle. A weight detection device is positioned to detect a weight of the objects in the trunk. An electronic processing device is communicatively coupled to each of the camera and the weight detection device. The electronic processing device causes a user of the vehicle to be informed of the objects in the trunk based on signals received from the camera and the weight detection device.

In another embodiment, the invention comprises a trunk inventory detection method for a motor vehicle, including capturing images of objects within a trunk of the motor vehicle. A weight of the objects in the trunk is detected. A user of the vehicle is informed of the objects in the trunk based on the captured images and the detected weight of the objects in the trunk.

In yet another embodiment, the invention comprises a trunk inventory detection arrangement for a motor vehicle, including a camera positioned to capture images of objects within a trunk of the motor vehicle. A weight detection device is positioned to detect a weight of the objects in the trunk. An electronic processing device is communicatively coupled to each of the camera and the weight detection device. The electronic processing device transmits signals based on signals received from the camera and the weight detection device. An electronic human interface device receives the signals from the electronic processing device, and informs a human user of the contents of the trunk based on the signals from the electronic processing device.

An advantage of the present invention is that it may remind occupants of a vehicle to remove items from the trunk of the vehicle when the occupants may have a need to do so.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
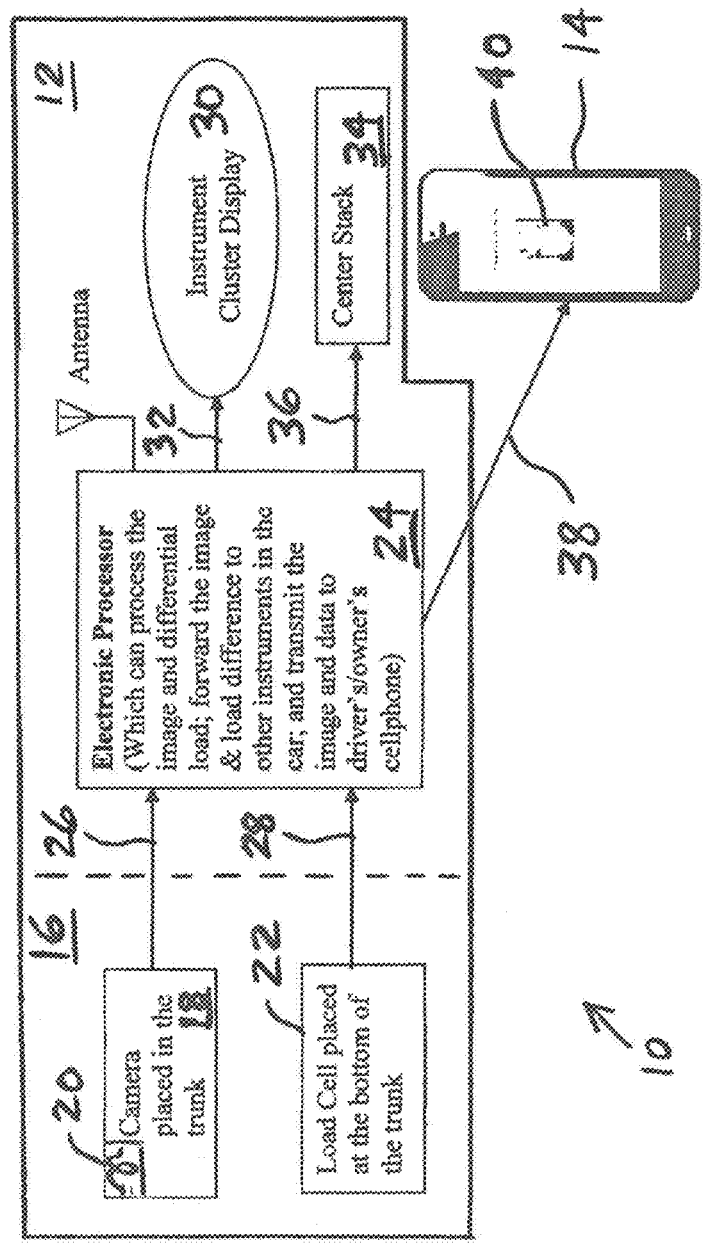
FIG. 1 is a block diagram of one example embodiment of a trunk inventory detection arrangement of the present invention.

FIG. 1 illustrates one embodiment of a trunk inventory detection arrangement 10 of the present invention, including a motor vehicle 12 and a driver's/owner's mobile electronic device 14. Vehicle 12 includes a trunk 16 having a camera 18 directed at the contents of trunk 16 and possibly including a flash bulb 20 for illuminating the trunk contents while the image of the trunk contents is being captured. Trunk 16 may also include a load cell 22 positioned below the contents of trunk 16 so as to measure the weight of the trunk contents.

During use, captured images of the trunk contents are transmitted to an electronic processor 24, as indicated at 26; and detected weights of the trunk contents are transmitted to electronic processor 24, as indicated at 28. Electronic processor 24 may process and forward the captured images and weight information to an instrument cluster display 30, as indicated at 32; a center stack 34, as indicated at 36; and mobile electronic device 14, as indicated at 38. Mobile electronic device 14, instrument cluster display 30, and/or center stack 34 may display the measured weights and/or the received images, as shown at 40, which may be a photograph of a carton of milk, for example, in trunk 16.

Electronic processor 24 may cause a user of the vehicle to be informed of the objects in the trunk only if at least one signal received from load cell 22 indicates that a weight of the objects in the trunk is above a threshold level. The threshold level may be a predetermined weight above a steady state weight level of the objects that may be semi-permanently stored in the trunk, such as a bag of sand or a shovel, for example. The threshold level may be dependent upon a minimum weight of trunk contents measured in a previous period of time exceeding twelve hours.

The images of the trunk contents may be captured in response to the vehicle being put in "park", or in response to the engine ignition being turned OFF, for example. The camera flash bulb 20 may provide the light for capturing the images, or the conventional trunk light that normally turns ON when the trunk lid is open may be used to illuminate the contents. In one embodiment, images are captured in response to the trunk lid being in the process of closing, and while the conventional trunk light is still ON.

In another embodiment, an infrared (IR) detector is mounted in the trunk and detects the presence of any cold objects (e.g., frozen or refrigerated food) in the trunk. The system informs the driver/owner particularly about the presence of cold objects in the trunk. The IR detector could also be used to warn the driver/owner of the presence of a living thing (e.g., a person), whose body temperature is within a predetermined range, and remains substantially constant over a period of time.

Figure 2:
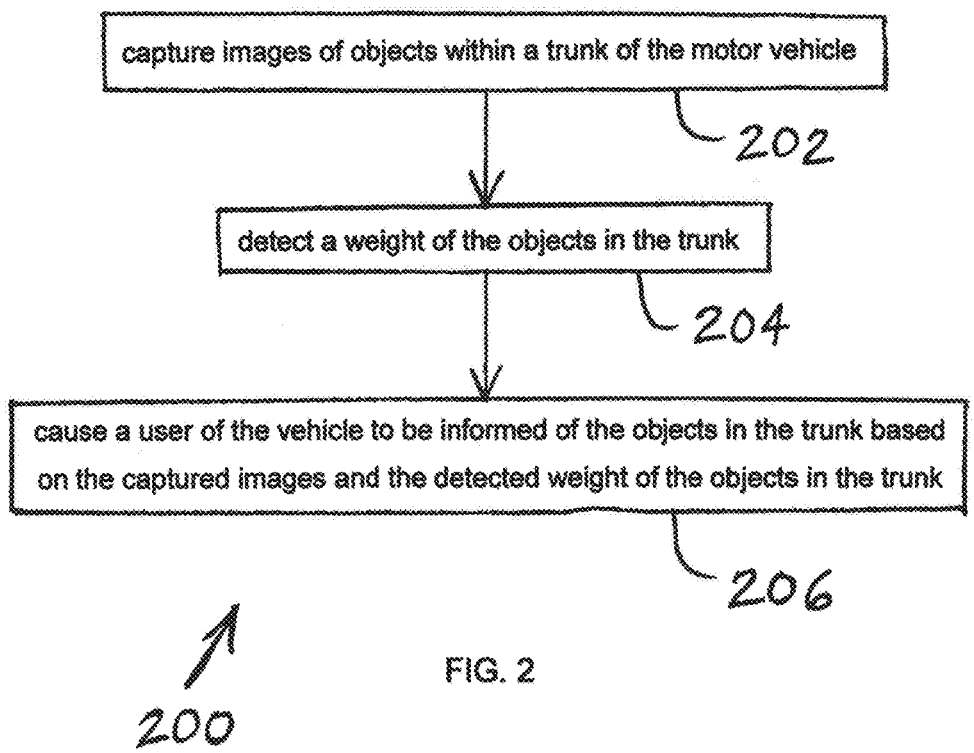
FIG. 2 is a flow chart of one embodiment of a trunk inventory detection method of the present invention for a motor vehicle.

FIG. 2 illustrates a flow chart of one embodiment of a trunk inventory detection method 200 of the present invention for a motor vehicle. In a first step 202, images of objects within a trunk of the motor vehicle are captured. For example, camera 18 may capture an image of the contents of trunk 16 each time the trunk lid is being closed.

In a next step 204, a weight of the objects in the trunk is detected. For example, load cell 22 may weigh the contents of trunk 16 immediately after the trunk lid is closed.

In a final step 206, a user of the vehicle is caused to be informed of the objects in the trunk based on the captured images and the detected weight of the objects in the trunk. For example, electronic processor 24 may process and forward the captured images and weight information to instrument cluster display 30, center stack 34, and mobile electronic device 14. Mobile electronic device 14, instrument cluster display 30, and/or center stack 34 may display the measured weights and/or the received images to the user.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A trunk inventory detection arrangement for a motor vehicle, the arrangement comprising:
   a camera positioned to capture images of objects within a trunk of the motor vehicle, the image capturing being performed in response to the vehicle being put into park gear or an engine ignition being turned off;
   a weight detection device positioned to detect a weight of the objects in the trunk; and
   an electronic processing device communicatively coupled to each of the camera and the weight detection device, the electronic processing device being configured to cause a user of the vehicle to be informed of the objects in the trunk based on signals received from the camera and the weight detection device.

2. The trunk inventory detection arrangement of claim 1 further comprising an electronic human interface device communicatively coupled to the electronic processing device and configured to inform a human user of the contents of the trunk based on the signals received from the camera and the weight detection device.

3. The trunk inventory detection arrangement of claim 2 wherein the electronic human interface device comprises an instrument cluster display installed in the motor vehicle.

4. The trunk inventory detection arrangement of claim 2 wherein the electronic human interface device comprises a center stack installed in the motor vehicle.

5. The trunk inventory detection arrangement of claim 1 wherein the signals received by the electronic processing device comprise first signals, the electronic processing device being configured to cause a user of the vehicle to be informed of the objects in the trunk by transmitting second signals to a cell phone of the user of the vehicle.

6. The trunk inventory detection arrangement of claim 1 wherein the electronic processing device is configured to cause a user of the vehicle to be informed of the objects in the trunk only if at least one said signal received from the weight detection device indicates that a weight of the objects in the trunk is above a threshold level.

7. The trunk inventory detection arrangement of claim 1 wherein the weight detection device comprises a load cell.

8. A trunk inventory detection method for a motor vehicle, the method comprising:
   capturing images of objects within a trunk of the motor vehicle while a lid of the trunk is being closed, but is not yet closed;
   detecting a weight of the objects in the trunk; and
   causing a user of the vehicle to be informed of the objects in the trunk based on the captured images and the detected weight of the objects in the trunk.

9. The trunk inventory detection method of claim 8 wherein the images are captured while the trunk is closed.

10. The trunk inventory detection method of claim 8 further comprising:
    providing an electronic human interface device communicatively coupled to the electronic processing device; and
    using the electronic human interface device to inform a human user of the contents of the trunk based on the signals received from the camera and the weight detection device.

11. The trunk inventory detection method of claim 8 wherein the images are captured in response to the vehicle being put into park or an engine ignition being turned off.

12. The trunk inventory detection method of claim 8 wherein the user of the vehicle is caused to be informed of the objects in the trunk by transmitting signals to a cell phone of the user of the vehicle.

13. The trunk inventory detection method of claim 8 wherein the user of the vehicle is caused to be informed of the objects in the trunk only if the detected weight of the objects in the trunk is above a threshold level.

14. The trunk inventory detection method of claim 13 wherein the threshold level is dependent upon a steady state weight of equipment semi-permanently stored in the trunk.

15. A trunk inventory detection arrangement for a motor vehicle, the arrangement comprising:
    a camera positioned to capture images of objects within a trunk of the motor vehicle;
    a weight detection device positioned to detect a weight of the objects in the trunk;
    an electronic processing device communicatively coupled to each of the camera and the weight detection device, the electronic processing device being configured to transmit signals based on signals received from the camera and the weight detection device; and
    an electronic human interface device configured to:
       receive the signals from the electronic processing device; and
       inform a human user of the contents of the trunk based on the signals from the electronic processing device, wherein the user of the vehicle is caused to be informed of the objects in the trunk only if the detected weight of the objects in the trunk is above a threshold level that is dependent upon a minimum weight of trunk contents measured in a previous period of time exceeding twelve hours.

16. The trunk inventory detection arrangement of claim 15 wherein the camera is configured to capture the images while the trunk is closed.

17. The trunk inventory detection arrangement of claim 15 wherein the camera is configured to capture the images while a lid of the trunk is being closed, but is not yet closed.

18. The trunk inventory detection arrangement of claim 15 wherein the camera is configured to capture the images in response to the vehicle being put into park or an engine ignition being turned off.

19. The trunk inventory detection method of claim 8 wherein the capturing step includes capturing images of objects within a trunk of the motor vehicle while a trunk light is still ON.

20. The trunk inventory detection arrangement of claim 1 wherein the camera also captures images of objects within a trunk of the motor vehicle in response to a lid of the trunk being in the process of closing, but before the lid is closed.

21. The trunk inventory detection arrangement of claim 15 wherein the camera captures images of objects within a trunk of the motor vehicle in response to a lid of the trunk being in the process of closing, but before the lid is closed.

\* \* \* \* \*